3,461,168
SYNTHESIS OF BROMOTHIOPHENOLS
Robert J. Laufer, Pittsburgh, Pa., assignor to Consolidation Coal Company, Pittsburgh, Pa., a corporation of Delaware
No Drawing. Filed Aug. 8, 1966, Ser. No. 570,715
Int. Cl. C07c 149/34
U.S. Cl. 260—608
7 Claims

ABSTRACT OF THE DISCLOSURE

In the synthesis of bromothiophenols wherein a brominated diphenyl disulfide is first made from a thiophenol and then reduced to the bromothiophenol, the improvement in the step of making the brominated diphenyl disulfide which consists in conducting the bromination of diphenyl disulfide in the presence of benzene.

---

This invention relates to an improved process for the synthesis of bromothiophenols.

The commercial use of bromothiophenols as rubber peptizers has been limited by the cost of their preparation. Direct bromination of thiophenols is not feasible since a diphenyl disulfide and hydrogen bromide are the products obtained, as shown in Equation 1 below:

Equation 1

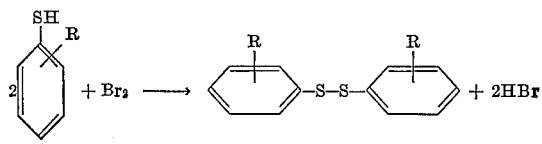

where R is either hydrogen or a lower alkyl radical.

Accordingly, it has been necessary to resort to indirect methods to make the bromothiophenols. For example, the diphenyl disulfide produced as shown in Equation 1, or by other methods, may be brominated, and the brominated product then reduced to yield the desired bromothiophenol, as shown in the following Equations 2 and 3, respectively:

Equation 2

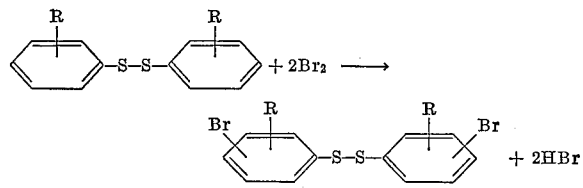

(Ref: Bourgeois et al., Rec. Trav. Chim. 30, 407–411.)

Equation 3

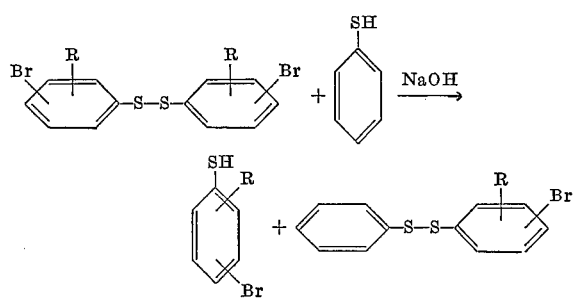

(Ref: Kleiman U.S. Patent 2,510,893.) Or, if desired, the brominated diphenyl disulfide may be reduced to the desired bromothiophenol by reduction with a mixture of zinc and hydrochloric acid which generates hydrogen "in situ," as shown in the following Equation 4:

Equation 4

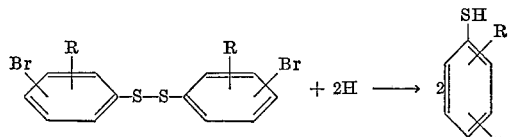

The reaction expressed in Equation 2 proceeds rapidly when no solvent is employed, even without a catalyst. However, scale-up of this reaction to commercial operation sometimes poses serious problems when no solvent is employed. For example, the brominated disulfide product may be high melting and solidify during the reaction, thus making effective control of the reaction temperature in a larger reactor impossible. This problem is particularly acute in the case of the synthesis of p-bromothiophenol. Easily recoverable solvents such as carbon tetrachloride and hexane have been used, but they seriously inhibit the reaction. See E. Bourgeois and A. Abraham, Rec. Trav. Chim. 30, 407 (1911), and O. Spinelli, Chem. Abs. 56, 2368 (1962). Other easily recoverable solvents which do not seriously inhibit the reaction are themselves brominated. Examples of such solvents are toluene and ethyl ether. Accordingly, they are not suitable for use in the bromination of diphenyl disulfide. Glacial acetic acid which is sometimes used in bromination reactions is not easily recoverable.

The primary object, therefore, of the present invention is to provide a commercially operable process for the synthesis of bromothiophenols in which bromination of a diphenyl disulfide is a step in the synthesis.

More specifically, the object of this invention is to provide a commercially feasible solvent in which bromination of a diphenyl disulfide may be conducted at a satisfactory rate.

Another object of this invention is to provide certain novel compounds.

In accordance with the present invention, an improvement is provided in the process of making bromothiophenols. That improvement comprises conducting bromination of diphenyl disulfide of the following formula in benzene, preferably in the presence of a halogenation catalyst:

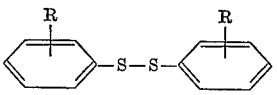

where R is either hydrogen or a lower alkyl radical, i.e. methyl to butyl, inclusive.

Benzene provides a solution or an easily stirred slurry of the reactants; is chemically inert; and is relatively cheap and easy to recover. While bromination does take place in benzene without catalysts, the rate is improved by use of the halogenation catalysts. Standard halogenation catalysts may be used. Examples of such catalysts are the Friedel-Crafts catalysts, preferably iodine, zinc chloride and iron. The most uniform and predictable results are obtained by brominating in the presence of iodine which is readily dissolved in the reaction mixture and is not significantly affected by minor contaminants in the feed. Catalysis by iodine does not result in complete conversion of bromine, and the excess must be subsequently removed in a separate treatment. However, by the use of iodine in benzene, side reactions are easily avoided.

For a better undesrstanding of the invention, its operation and advantages, reference should be had to the following examples of the preferred embodiment of the invention.

Apparatus

The apparatus, the same for each example, consisted of a two-liter, four-neck flask fitted with a stirrer, thermometer, dropping funnel, and reflux condenser. The condenser was vented via a drying tube containing Drierite to a water-scrubber. (No metal should be in contact with the reaction mixture.)

Example 1.—Synthesis of p-bromothiophenol (1) The flask was charged with 220 grams of diphenyl disulfide,

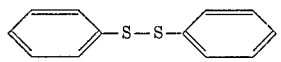

and 150 grams of 171 ml. of dry benzene. The mixture was a clear solution at 30° C. At 22° C., a heavy slurry formed within 15 minutes of seeding. The slurry could be stirred reasonably well.

(2) Five grams of iodine crystals were added. The temperature was adjusted to 20° C. Then, 320 grams (105 ml.) of bromine were added as follows:

| Time, Min. | Temp., °C. | | Volume (ml.) Br₂ Charged | Comments |
|---|---|---|---|---|
| 0 | 20 | | 0 | Begin Br₂ addition. |
| 9 | 19 | | 8 | |
| 16 | 20 | | 15 | Solid dissolves. |
| 33 | 20 | | 35 | HBr reaches scrubber. |
| 54 | 20 | | 55 | 20 g. HBr in scrubber. |
| 68 | 20 | | 70 | 40 g. HBr. |
| 87 | 20 | | 105 | 75 g. HBr. |
| 183 | 20/22 | Mild cooling. | | 108.4 g. HBr. Crystallization begins. |
| 267 | 21 | | | 119.4 g. HBr. Heat slowly. |
| 298 | 25 | | | 123.5 g. HBr. |
| 330 | 26 | | | 126.2 g. HBr. Dense slurry. |
| 381 | 39 | | 1 | 131.5 g. HBr. Almost completely liquid. |
| 400 | 46 | | | 133.7 g. HBr. |

The conversion of the diphenyl disulfide was 87.0%.

(3) The reaction mixture was treated with thiophenol which was added slowly below 40° C. to avoid excessive loss of benzene vapor to the off-gas stream. The thiophenol was added until all unreacted bromine was consumed as evidenced by a sudden cessation of hydrogen bromide evolution. The required amount of thiophenol was 45.8 grams. If desired, aqueous sodium metabisulfite may be used in place of thiophenol to destroy the unreacted bromine.

(4) One hundred grams (113 ml.) of benzene were added to the reaction mixture, and the latter was heated to atmospheric reflux (83–89° C.) for 10–15 minutes to remove dissolved HBr.

(5) The benzene solution of brominated disulfide was cooled to 55° C. and 99 grams of zinc powder added with stirring. (A slight temperature rise may occur if some HBr remains in the reaction product.)

(6) Then, 755 ml. of dilute aqueous hydrochloric acid were added over a period of 35 minutes at 53–57° C. with cooling as required to limit the temperature. The temperature was maintained near 50° C. for three additional hours. Some cooling was necessary for about one hour following acid addition.

(7) The mixture was then heated to reflux (80° C.) over a period of about one hour, and refluxing was continued for one hour.

(8) The reaction mixture was cooled to 60° C. and stirring halted. The unreacted zinc and mineral contaminants settled rapidly to the bottom of the flask. The liquid phases separated quickly and sharply. The lower, clear, almost colorless aqueous phase was drained with the mineral sludge from the reactor.

(9) The upper oil phase was then contacted with 500 ml. of hot water at 60° C. for about 10–15 minutes. Phase separation was again rapid after stirring was halted. The clear (lower) oil phase was drained into a distilling flask. A small amount of grey powder accumulated at the interface and in the oil phase. This powder was included in the still charge.

(10) The benzene solution of product did not crystallize when stored at 25° C. or higher. The reaction product was distilled through a 1″ x 48″ Vigreaux column and the product analyzed by vapor phase chromatography.

| Cut No. | Head Temp., °C. | Pressure, mm. | Pot Temp., °C. | Net Weight |
|---|---|---|---|---|
| 1 | 65–88 | 730 | 96–150 | 199.3 |
| 2 | 60–111 | 20 | 95–118 | 97.4 |
| 3 | 111–118 To | 20 2 | 118–250 −185 | 294.2 |
| Residue | (Crystalline, yellow solid, M.P. 90° C.) | | | 8.4 |

ANALYSES (PERCENT BY WT.)

| Cut No. | Benzene | Thiophenol | p-Bromo-thiophenol | Others |
|---|---|---|---|---|
| 1 | 99.7 | 0.3 | | |
| 2 | 8.1 | 73.1 | 17.7 | 1.1 |
| 3 | | 1.0 | 96.8 | 2.2 |

The yield of p-bromothiophenol was 91.2%. Yield is expressed as percent of theory based on disulfide converted in the bromination step.

In similar manner and with generally similar results, Fe powder, and ZnCl₂ were used as halogenation catalysts. The following Table I tabulates the results obtained with those catalysts and includes the results obtained with I₂ as catalyst.

In all the runs reported in Table I, 220 grams of recrystallized diphenyl disulfide were used. The weight of bromine added in each run was 320 grams. The temperature of the bromine reaction was maintained at 20° C. during the addition of the bromine. The reaction time is reported in Table I since it depended upon the catalyst selected.

TABLE I

| Run No. | Solvent | Catalyst (Amount) | Reaction Time,[1] hrs. | Conversion of Diphenyl Disulfide, percent | Yield of p-Bromothiophenol,[2] percent | Distillation Residue (Wt.), g. |
|---|---|---|---|---|---|---|
| 1 | Benzene | I₂ (5 g.) | 6.6 | 87.0 | 91.2 | 8.2 |
| 2 | do | Fe Powder (10 mg.) | 6.0 | 95.0 | 90.5 | 28.7 |
| 3 | do | ZnCl₂ (5 g.) | 8.0 | 84.3 | 95.6 | 13.6 |
| 4 | Toluene | I₂ (5 g.) | 4.5 | 65.2 | 86.0 | 31.4 |

[1] Hours from beginning of Br₂ addition to complete consumption of Br₂.
[2] Percent of theory based on converted disulfide.

Example 2.—Synthesis of 4-bromo-2-isopropylthiophenol

A solution of 600 grams of 2-isopropylthiophenol in 1000 ml. of pentane was treated with a slow stream of chlorine for several hours at a rate which maintained a steady reflux of the solvent. Chlorination was halted when abrupt cessation of hydrogen chloride evolution occurred. The solution was chilled and crystal growth initiated. The crystals were washed with pentane and dried to yield 329 grams of colorless product, M.P. 58.5–60.0° C. An additional 170 grams of pure product were recovered from the mother liquors. Analyses established the product to be bis-[2-isopropylphenyl]disulfide.

To a stirred solution of 144 grams of bis-[2-isopropylphenyl]disulfide and 5 grams of iodine in 125 ml. of benzene was added 153 grams of bromine over a period of 30 minutes. The temperature, during the period of bromine addition, was kept below 31° C. by external cooling. The solution was thereafter kept at room temperature for 3 days. Dissolved hydrogen bromide was removed by refluxing at 47° C. and at a pressure of 250 torr. The solution was treated with 25 grams of sodium metabisulfite in 125 ml. of water to remove unreacted bromine. The benzene phase was washed with water and dried azeotropically.

The dried solution was treated with 39 grams of zinc dust and 298 ml. of 6 N aqueous hydrochloric acid. After three hours at reflux, the mixture was separated. The benzene phase was freed of acid by washing with water. Distillation at 20 torr yielded 38 grams of a forecut, B.P. 110–145° C., and 164 grams of a pure compound, B.P. 145° C., which analyses established to be 4-bromo-2-isopropylthiophenol. The distillation residue weighed 9.4 grams Example 3.—Synthesis of 2-bromo-4-(t-butyl)-thiophenol Bis-[4-(t-butyl)phenyl]disulfide, M.P. 89.0–91.0° C., was prepared in almost quantitative yield by the procedure described in Example 2 for the preparation of bis-[2-isopropylphenyl]disulfide. An easily-stirred slurry of 355 grams of bis-[4-(t-butyl)-phenyl]disulfide and 5 grams of iodine in 225 ml. of benzene was treated with 334 grams of bromine at 23–31° C. over an 80-minute period. After two days at room temperature, the reaction mixture was subjected to a short period of refluxing at 55° C. and 300 torr to remove dissolved hydrogen bromide. The remaining bromine was removed by treatment with 40 grams of sodium metabisulfite in 160 ml. of water. The benzene solution of brominated disulfide was washed with water, dried, and treated with 95 grams of zinc dust and 700 ml. of 6 N aqueous hydrochloric acid (three hours at reflux). Distillation at 10 torr yielded a 79 gram forecut (B.P. 90–140° C.) and 372 grams of a pure compound, B.P. 140° C., which analyses established to be 2-bromo-4-(t-butyl)-thiophenol. The distillation residue weighed 26.6 grams.

To the best of my knowledge, both of the bromothiols, namely, 4-bromo-2-isopropylthiophenol and 2-bromo-4-(t-butyl)-thiophenol are new compounds. They may be used in conventional fashion as rubber peptizers. The intermediate disulfide, bis-[2-isopropylphenyl]disulfide, is also believed to be novel.

I claim:
1. 4-bromo-2-isopropylthiophenol.
2. 2-bromo-4-(t-butyl)-thiophenol.
3. The process of brominating a diphenyl disulfide having the formula

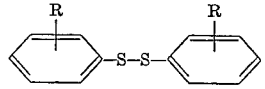

where R is selected from the class consisting of hydrogen and lower alkyl radicals, which comprises adding bromine to a solution of said diphenyl disulfide in benzene.
4. The process according to claim 3 in which a halogenation catalyst is added to the benzene solution.
5. The process according to claim 4 in which the catalyst is iodine.
6. The process according to claim 3 in which the product of bromination is reduced to form a thiol.
7. The process according to claim 3 in which the diphenyl disulfide is diphenyldisulfide itself and the product of bromination is reduced to form p-bromothiophenol.

References Cited

UNITED STATES PATENTS 2,506,416  5/1950  Gilbert et al. _____ 260—609
3,133,972  5/1964  Handlovits et al. __ 260—608 XR

OTHER REFERENCES

Spinelli, "Chem. Abstracts," vol. 56 (1962), p. 2368.
Bourgeois, "Rec. Trav. Chim.," vol. 30 (1911), pp. 407–413.
Olah, "Frie. Crafts and Related Rea.," vol. III, p. 1539.

CHARLES B. PARKER, Primary Examiner

D. R. PHILLIPS, Assistant Examiner

U.S. Cl. X.R.

260—609